March 24, 1964 E. E. SCHWENZFEGER ETAL 3,126,525
FERROELECTRIC DEVICE FOR COUNTING MESSAGES BETWEEN
CODE RECORDER AND TRANSMITTER
Filed Dec. 16, 1958 2 Sheets-Sheet 1
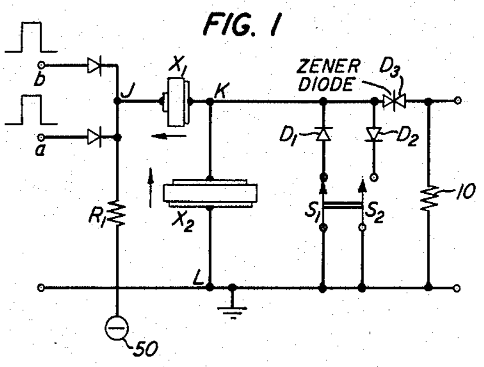
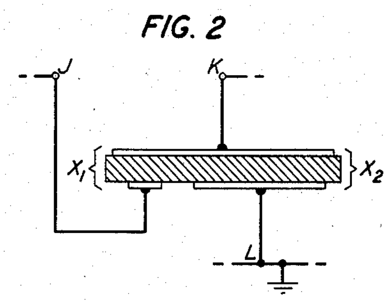
FIG. 3
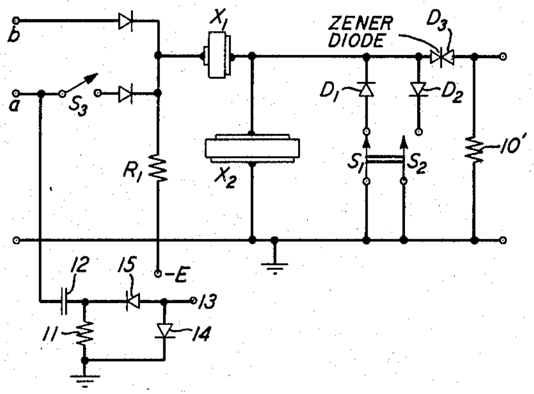
FIG. 6
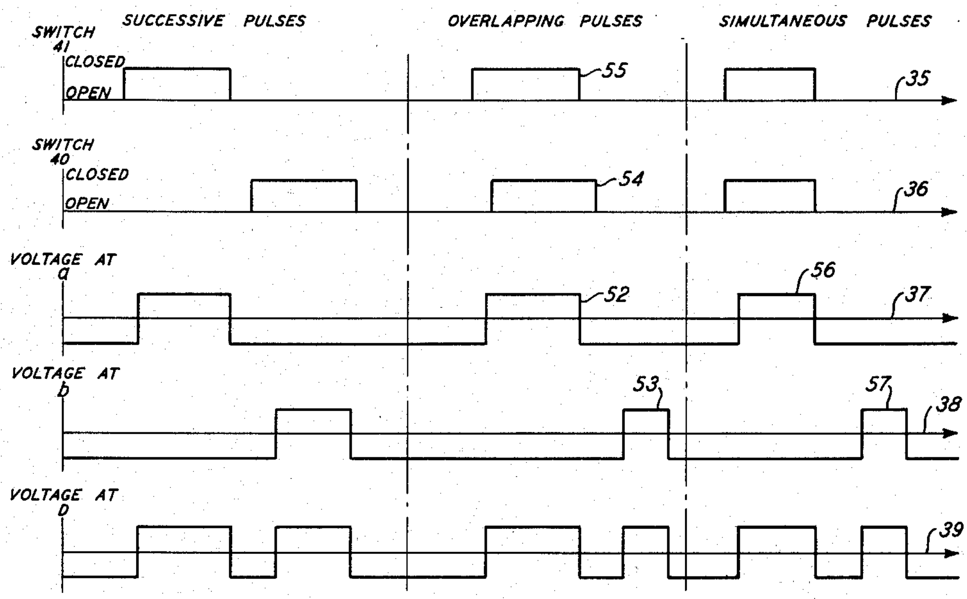
INVENTORS E. E. SCHWENZFEGER
I. M. VOGT
BY S.E.Hollander
ATTORNEY INVENTORS E. E. SCHWENZFEGER
I. M. VOGT
BY
S.E. Hollander
ATTORNEY United States Patent Office 3,126,525
Patented Mar. 24, 1964

3,126,525

FERROELECTRIC DEVICE FOR COUNTING MESSAGES BETWEEN CODE RECORDER AND TRANSMITTER

Edward E. Schwenzfeger, Bayside, N.Y., and Irmfried M. Vogt, East Orange, N.J., assignors to Bell Telephone Laboratories, Incorporated, New York, N.Y., a corporation of New York Filed Dec. 16, 1958, Ser. No. 780,763
30 Claims. (Cl. 340—173.2)

Figure 4:
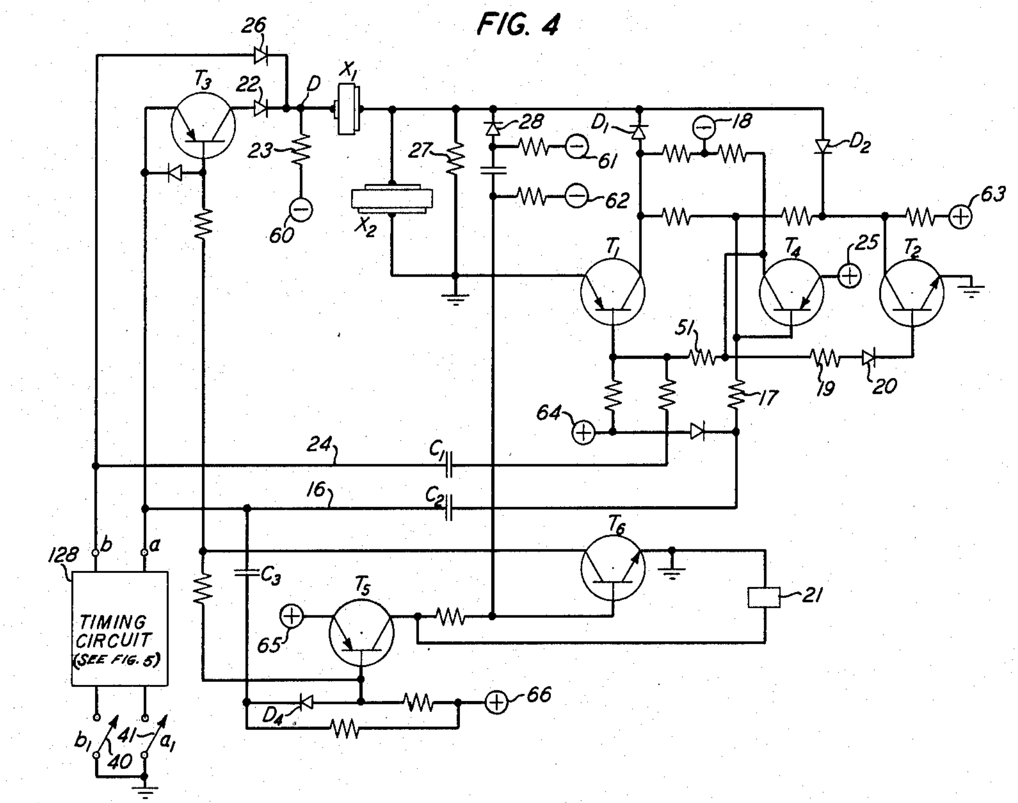

This invention relates to ferroelectric counting circuits and more particularly to a ferroelectric message count-in–count-out circuit for use in teletypewriter or telegraph systems.

In certain teletypewriter and telegraph transmission systems the transmitter is conditioned to be operated when the attendant initiates a message. Assuming that other system factors permit, e.g., the originating station is given permission to transmit by the control station, the speed of transmission will be limited by the speed of the attendant. Since transmission capabilities often far exceed the highest speed attainable by the attendant or typist, a marked inefficiency obtains in realization of potential system capacity.

In other types of telegraph and teletypewriter systems where a continuous tape exists between the transmitter and the message perforator, serious and costly delays in the operation of the entire transmission system may occur if transmission is interrupted when a taut tape condition is encountered or when the transmitter overtakes the perforator.

Moreover, in those continuous tape systems where a differential in speed between transmitter and perforator exists or where high speed reading devices are utilized it is particularly essential to insure that a complete message is available to the reader before reading begins.

It is, therefore, an object of this invention to prevent the initiation of transmission of a message until at least one complete message is in storage in the tape.

An additional object of this invention is to provide for continuous registration of the aggregate difference between messages transmitted and messages received, thereby indicating the number of complete messages in storage.

A further object of this invention is to provide an improved count-in–count-out circuit employing ferroelectric condensers.

Another object of this invention is to provide for the effective counting of end-of-message signals which arrive simultaneously from the perforator and transmitter.

These and other objects of the invention are achieved in an illustrative embodiment in which a ferroelectric condenser count-in–count-out circuit is utilized in conjunction with an input timing circuit. The timing circuit is arranged to meet those situations in which pulses from the perforator and transmitter, indicating ends of messages, are simultaneously delivered to the count-in–count-out circuit or are concurrently delivered to the count-in–count-out circuit.

The timing circuit includes a pair of "add" and "subtract" input leads respectively connected to the perforator and reader and a pair of "add" and "subtract" output leads respectively connected to two corresponding input leads to the count-in–count-out circuit.

For each message completed by the perforator an end-of-message or "add" signal is forwarded to the "add" input lead of the timing circuit to increase the total count in the counting circuit. As each message is dispatched by the transmitter or reader an end-of-message or "subtract" indication is sent to the timer input to decrease the aggregate count in the counting circuit.

The circuit is arranged to permit the transmitter to operate as soon as one complete message is stored in the tape (and in the count-in–count-out circuit). An output pulse adapted to prevent further energization of the tape transmitter or reader is produced by the counting circuit on the $n$th subtraction or end-of-message pulse from the reader after $n$ messages or "add" pulses have been stored in the tape and counter respectively.

A pair of ferroelectric condensers and two pairs of transistors in the timing circuit are arranged to produce an output on one of the two timer output leads for delivery to the two corresponding input leads of the count-in–count-out circuit. When an "add" pulse is delivered to the input of the timing circuit an "add" output pulse is produced and transmitted to the count-in–count-out circuit. Similarly, a "subtract" pulse delivered to the input of the timing circuit will produce a "subtract" pulse at the output of the timing circuit for transmission to the count-in–count-out circuit.

If, during the continuance of an "add" pulse at the input of the timing circuit, a "subtract" pulse is delivered to the input of the timing circuit, the output of the timing circuit remains unchanged and continues to produce an "add" pulse. During the interval when both input pulses to the timing circuit overlap, a ferroelectric condenser connected to the last input to arrive at the timing circuit is reoriented in polarization. When the "add" pulse at the input to the timing circuit terminates, a "subtract" pulse appears at the output of the timing circuit after a predetermined delay interval and the ferroelectric condenser is switched back to its original polarization. The second output or "subtract" pulse will be delivered at the output of the timing circuit even in those instances where the "subtract" pulse at the input to the timing circuit has terminated before the "add" pulse has terminated. Thus, where one pulse completely overshadows the other by beginning earlier and ending later, the correct sequence of output pulses nevertheless ensues.

In one illustrative embodiment, the first "add" pulse to appear at the input to the count-in–count-out circuit is absorbed without affecting the total count stored, but a transistor switch is operated to indicate a tape-in condition, i.e., a condition in which the tape reader is ordinarily permitted to begin reading.

The purpose of absorbing the first "add" pulse is to permit an output from the count-in–count-out circuit when the $n$th "subtract" pulse is received after $n$ "add" pulses are stored. Unless the first "add" pulse is absorbed, an output will not be obtained from the count-in–count-out circuit until the $(n+1)$th "subtract" pulse is received. This feature will be explained in detail herein.

The basic elements of the count-in–count-out circuit include two ferroelectric condensers, a smaller of which has electrodes having an area A capable of switching a unit charge $q$. The electrodes on the other condenser have an area $n \times A$ and are, therefore, adapted to switch a charge approximating $n \times q$. Under this arrangement the maximum number of end-of-message indications that may be counted is $n$.

For each "add' pulse that is delivered to the count-in–count-out circuit, the smaller condenser is reoriented and switches in series with one unit charge of the large condenser. When the "add" pulse (representing an end-of-message indication from the tape-perforator) terminates, the smaller condenser is reoriented to its original polarization and the larger condenser remains unchanged in consequence of a low impedance path established thereacross by transistor switches during the reorientation cycle. This process is repeated each time an end-of-message indication or "add" pulse is received from the perforator.

In subtracting from the number of stored messages, end-of-message signals from the reader or transmitter appear at the "subtract" input terminal to the count-in-count-out circuit as described above in the operation of the timer. When a "subtract" signal arrives at the input to the count-in–count-out circuit, the smaller condenser is switched in orientation but does not switch in series with the larger condenser since additional transistor switches establish a low impedance path across the larger condenser to by-pass any current from the smaller condenser during the input pulse. When the "subtract" pulse terminates, however, the smaller condenser is reoriented to its original polarization over a circuit including the larger condenser thus permitting a unit charge of the larger condenser to the switched back. In this manner the total charge on the larger condenser is reduced by one unit.

A feature of this invention is a count-in–count-out circuit comprising a pair of ferroelectric condensers.

Another feature of this invention is transistor switches adapted to by-pass a larger of the two condensers during appropriate portions of the operating cycle.

A further feature of this invention includes apparatus for absorbing an initial input pulse to the count-in–count-out circuit.

A still further feature of this invention includes apparatus responsive to the reception of the absorbed initial pulse for energizing equipment to indicate a tape-in condition.

Still another feature of this invention includes apparatus for producing successive output pulses in response to the reception of successive input pulses in the order of the appearance of the input pulses.

Still another feature of this invention is a timing circuit including ferroelectric condensers for producing successive output pulses in instances where two input pulses arrive simultaneously.

An additional feature of this invention is a timing circuit including ferroelectric condensers for producing successive output pulses where input pulses arrive concurrently or overlap, the output pulses reflecting the time order of arrival of the input pulses.

A further feature of this invention includes apparatus for producing an output pulse in response to an input pulse where the input pulse terminates before the inception of the output pulse.

Still another feature of this invention is a pair of ferroelectric condensers adapted to serve as memory devices to record the order of arrival of input pulses to a timing circuit.

A further feature of this invention includes circuitry in connection with the memory devices for producing output pulses after the termination of the imput pulses, the order of arrival of which is recorded in the memory devices.

Figure 5:
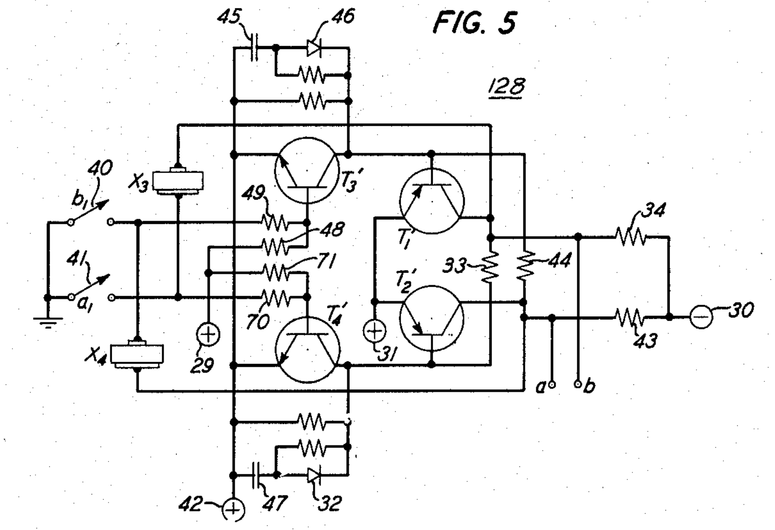

A more complete understanding of the invention will be afforded from an examination of the following specification, appended claims and attached drawing, in which:

FIG. 1 shows a message count-in–count-out circuit employing ferroelectric crystals wherein an output is provided on the $(n+1)$th subtraction after $n$ messages have been stored;

FIG. 2 indicates the manner in which the separate crystals of FIG. 1 may be incorporated in a single crystal;

FIG. 3 shows a message count-in–count-out circuit wherein an output is provided when the $n$th subtraction in made after $n$ messages have been stored;

FIG. 4 indicates a count-in–count-out circuit similar to that of FIG. 3 wherein transistor switches are utilized and a timing circuit is connected at the input;

FIG. 5 is a detailed rendition of the timing circuit down in outline form in FIG. 4; and FIG. 6 is a graphic representation of the action of the timing circuit of FIG. 5 illustrating the output voltages in the cases of simultaneous, overlapping or successive pulses from the perforator and transmitter.

Referring now to FIG. 1, a counting circuit comprising an integral part of the invention is shown. Condensers $X_1$ and $X_2$ are ferroelectric crystals. The electrodes on crystal $X_1$ have an area A and the electrodes of crystal $X_2$, $n \times A$. It will be assumed that they are adapted to switch a charge $q$ and $n \times q$, respectively. Under this arrangement the maximum number of units or stored messages that may be counted is $n$. "Add" signals are supplied to terminal $a$ and "subtract" signals to terminal $b$. For a detailed description of the manner in which the "add" and "subtract" signals are evolved in the perforator and transmitter, reference may be made to Patent No. 2,575,329 of W. B. Blanton et al., issued on November 21, 1951.

The perforator and reader internal circuitry are omitted from the present disclosure for clarity; reference may be made to Patent No. 2,766,318 of W. M. Bacon et al., issued on October 9, 1956, for a comprehensive description of the perforator and reader equipment.

In the initial state in FIG. 1 crystals $X_1$ and $X_2$ are polarized as indicated by the arrows. The polarization circuit for crystals $X_1$ and $X_2$ extends from ground, crystals $X_2$ and $X_1$ in series, resistance $R_1$, to a source of negative potential 50.

When an end-of-message signal is transmitted to the counting circuit from the perforator (via the timing circuit, not shown), comprising an "add" signal, switch $S_2$ is opened and switch $S_1$ is closed. The positive pulse representing the "add" signal is supplied to input $a$ and crystal $X_1$ switches in series with one unit charge of crystal $X_2$. When the "add" signal pulse terminates, condenser $X_1$ is reoriented to its original polarization over a circuit from ground, switch $S_1$, diode $D_1$, crystal $X_1$, resistance $R_1$ to negative source 50. Thus one unit charge has been added to condenser $X_2$. This process is repeated each time a positive pulse is applied at input terminal $a$.

To subtract from the number of stored messages, end-of-message signals from the reader which appear as positive voltage pulses are applied (via the timer, not shown), at input terminal $b$. Under these conditions switch $S_2$ is closed and switch $S_1$ opened. The circuitry for operation of switches $S_1$ and $S_2$ may be similar to that shown in detail in FIG. 4 for the equivalent function.

When a positive voltage ("subtract" pulse) is applied at input $b$, crystal $X_1$ will switch in series with diode $D_2$. At the conclusion of the positive input pulse at terminal $b$ crystal $X_1$ will be reoriented in polarization by switching back across crystal $X_2$ in series with resistance $R_1$. In this situation the path across diode $D_2$ is blocked in view of the poling of diode $D_2$. Consequently, one unit charge $q$ of condenser $X_2$ is switched back or removed. A similar sequence of events takes place each time a "subtract" pulse appears at terminal $b$.

If at least one unit charge remains stored in crystal $X_2$, the switching voltage across crystal $X_2$ will not exceed a coercive voltage $E_C$ which is insufficient to overcome the breakdown voltage of Zener or breakdown diode $D_3$. However, if no charge remains in crystal $X_2$ and if source 50 has a voltage $-E$, a voltage approximating $(E-E_C)$ will appear across crystal $X_2$. This potential is sufficient to make diode $D_3$ conduct and the negative pulse across output resistance 10 is utilized through conventional circuitry to remove permission for the reader to operate.

The operation of the circuit of FIG. 2 is similar in all respects to that of FIG. 1 traced above, with the exception that in FIG. 2 the electrodes are all mounted on a single crystal unit. Terminals J, K and L represent corresponding connections for substituting the single crystal of FIG. 2 for the two crystals of FIG. 1.

Under the arrangement shown in FIG. 1 with $n$ messages stored in crystal $X_2$, the circuit will produce an output pulse across resistance 10 when the $(n+1)$th "subtract" pulse is applied to input $b$, since the $n$th "subtract" pulse will produce only a voltage equal to $E_C$ across the output resistance 10 in removing the final unit charge.

FIG. 3 indicates a rearrangement of the circuit of FIG. 1 in which an output pulse is produced across resistance 10′ on the $n$th subtraction after $n$ messages have been stored. In the arrangement of FIG. 3 the first "add" pulse applied at terminal $a$ will not be stored in crystal $X_2$ since switch $S_3$ is open. After switch $S_3$ is operated, succeeding pulses at terminal $a$ are stored in crystal $X_2$ in the manner shown for the operation of FIG. 1.

Since the number of messages stored in crystal $X_2$ of FIG. 3 are equal to $n$ messages and a complete message has been perforated before switch $S_3$ is closed, the counting circuit counts $n+1$ messages. The number of pulses that need be applied to terminal $b$ to remove all of the charge from crystal $X_2$ is only $n$. Consequently, an output is produced across resistance 10′ when the $n$th subtraction is made.

In FIG. 3 the first input pulse is absorbed before switch $S_3$ is closed, as explained above. The input pulse appearing at terminal $a$ is differentiated through capacitor 12 and resistance 11 to produce a negative output pulse at terminal 13. This pulse is transferred to appropriate circuitry in the tape reader to establish the "tape-in" condition, i.e., a condition in which the tape reader is permitted to read. Switch $S_3$ may be operated at this time in a manner similar to that shown in detail in FIG. 4. Diodes 14 and 15 permit only the negative differentiated pulse to pass to terminal 13. When switch $S_3$ is closed, succeeding pulses on terminal $a$ switch crystals $X_1$ and $X_2$ in series in the manner described for FIG. 1.

*Counting (Addition)*

In FIG. 4 input "add" pulses on terminal $a$ from the perforator are initially connected to the emitter of transistor $T_3$ via the timing circuit 128, described in detail infra, to energize transistor $T_3$. At the same time, the positive "add" pulse is conveyed over conductor 16, capacitor $C_2$ and resistance 17 to the base of transistor $T_4$ turning that transistor off. In doing so, conventional flip-flop circuitry interconnecting transistors $T_1$ and $T_4$ turns transistor $T_1$ on, establishing a low impedance path between ground, the emitter-collector path of transistor $T_1$ and diode $D_1$ to bridge condenser $X_2$.

Since transistor $T_4$ is now in the off or high impedance state, a negative potential approaching that of source 18 appears on the collector electrode of transistor $T_4$ and biases transistor $T_2$ in the off condition over resistor 19 and diode 20.

When the first "add" pulse terminates, transistor $T_5$ is switched "on" by a negative pulse derived by differentiating the input pulse over capacitor $C_3$ in the manner described for FIG. 3. Transistor $T_6$ is switched "on" by the positive pulse appearing at the collector electrode of transistor $T_5$. Utilization circuit 21, which may illustratively comprise a start relay in the reader circuit, is energized over an obvious path to give a "tape-in" condition.

As additional pulses appear at terminal $a$ they are coupled through transistor $T_3$ which is now in the low impedance or conducting condition to switch condenser $X_1$ in series with condenser $X_2$ through diode 22. As each positive "add" pulse terminates, condenser $X_1$ is reoriented through resistance 23 to negative battery in series with diode $D_1$ and transistor $T_1$. This procedure continues each time an input pulse appears at terminal $a$.

*Counting (Subtraction)*

When a "subtract" pulse appears at terminal $b$, via timer 128 it is coupled over conductor 24 and capacitor $C_1$ to the base of transistor $T_1$, turning that transistor off, and through conventional flip-flop circuitry, turning transistor $T_4$ on. When transistor $T_4$ conducts, the collector potential thereof approaches the potential of source 25 and the positive potential thus applied to the base of transistor $T_2$, over resistances 51 and 19 and diode 20, drives transistor $T_2$ into the conducting state.

At the same time the positive "subtract" pulse is coupled from terminal $b$ through diode 26 to switch condenser $X_1$ in series with diode $D_2$ and transistor $T_2$ which is now in the low impedance condition.

When the input pulse on terminal $b$ terminates, condenser $X_1$ is reoriented in series with condenser $X_2$ through resistance 23 and negative battery to remove one unit charge from condenser $X_2$. It will be noted that diode $D_2$ is reverse biased during reorientation to prevent transistor $T_2$ from by-passing condenser $X_2$.

Subsequent input pulses on terminal $b$ each removes a unit charge of the remaining charge from condenser $X_2$ until no further charge remains. On the $n$th "subtract" pulse the output voltage of condenser $X_2$ across resistance 27 exceeds the coercive voltage and overcomes the reverse bias on diode 28 to apply a negative potential to the base of transistor $T_6$ thereby deenergizing transistors $T_5$ and $T_6$. In so doing, utilization circuit 21, shown symbolically, is deenergized to remove the "tape-in" condition.

*Counter Input Timing Circuit*

FIG. 5 indicates a timing circuit suitable for use as timing circuit 128 shown in outline form in FIG. 4. The circuitry of FIG. 5 is adapted to meet those situations in which signals arrive on terminals $a_1$ and $b_1$ from the perforator and reader simultaneously, or overlap. In general, the circuitry of FIG. 5 is adapted to provide an output at terminal $a$ when an input appears at $a_1$ and at terminal $b$ when an input appears at $b_1$.

If an "add" input arrives at $a_1$ when there is a "subtract" input present at $b_1$, the conditions at terminals $a$ and $b$ are not affected and the input at $a_1$ is stored in a ferroelectric crystal. When the input at $b_1$ terminates, the output voltage at terminal $b$ is removed and a delay is instituted sufficient to permit switching actions of condensers $X_1$ and $X_2$ of the counter. Subsequently, an output is provided at terminal $a$ for a period adequate to complete the desired switching of condensers $X_1$ and $X_2$.

If an input arrives at $b_1$ when there is an input at $a_1$ already present, the conditions at $a$ and $b$ remain unchanged and the input at $b_1$ is stored in a ferroelectric crystal. When the input pulse at $a_1$ terminates, the output voltage at $a$ is removed and a delay is provided sufficient to permit switching actions at crystals $X_1$ and $X_2$ to terminate. Subsequently, an output is provided at terminal $a$ for a period adequate to complete switching of crystals $X_1$ and $X_2$.

If both inputs at terminals $a_1$ and $b_1$ arrive simultaneously, one input is preferred by a flip-flop circuit and the succeeding action is as described above.

Terminals $a_1$ and $b_1$ are conditioned to be energized and contacts 41 and 40 operated when end-of message signals appear at the perforator and reader respectively. A detailed description of circuitry suitable for the operation of contacts 40 and 41 may be found in Patent No. 2,502,654 of G. G. Keyes on April 4, 1950.

*Successive "Add" and "Subtract" Pulses*

In examining the circuit of FIG. 5 it is seen that in the quiescent state transistors $T_3'$ and $T_4'$ are conducting in consequence of positive potential at their base electrodes from source 29.

Assuming that an "add" input pulse is applied by closing switch 41 at terminal $a_1$, the ground condition applied to the base of transistor $T_4'$ turns that transistor off. The voltage at the collector of $T_4'$ falls from a potential approaching source 42 to a potential approaching that at source 31 which is designed to be at a lower positive potential than source 42. This negative voltage applied to the base electrode of transistor $T_2'$ drives that transistor into the conducting condition and a pulse is applied to terminal $a$ which approaches the potential of source 31.

It will be noted, however, that transistor $T_2'$ is not instantaneously energized when transistor $T_4'$ is turned off. This follows since capacitor 47 has charged during the "on" time of transistor $T_4'$ to a positive potential approaching that of source 42. Consequently, when transistor $T_4'$ is turned off capacitor 47 maintains the voltage at the base electrode of transistor $T_2'$ positive for a brief interval during which capacitor 47 is permitted to discharge through diode 32 and resistors 33 and 34 to negative supply 30. When capacitor 47 discharges to a level sufficient to permit conduction of transistor $T_2'$ an output pulse is supplied at terminal *a*. After switch 41 opens, transistors $T_1'$ and $T_2'$ are both nonconducting as a result of the positive potential at their base electrodes from the collectors of transistors $T_3'$ and $T_4'$.

This brief delay in the interim between the application of the input pulse at terminal $a_1$ and the appearance of an output pulse at terminal *a* is graphically illustrated in FIG. 6 by the slight lag between the beginning of the input pulse at terminal $a_1$ when switch 41 is closed and the voltage output at terminal *a*, shown on lines 35 and 37, respectively.

When the "add" pulse terminates and switch 41 is opened transistor $T_4'$ is again turned on and transistor $T_2'$ turned off.

Assuming that a pulse is now applied at terminal $b_1$ by closing switch 40, a ground condition is applied to the base of transistor $T_3'$ to drive transistor $T_3'$ into the nonconducting condition. The voltage at the collector of $T_3'$ falls from a potential approaching source 42 to a potential approaching that at source 31. The negative voltage thus applied to the base electrode of transistor $T_1'$ drives that transistor into the conducting condition and the potential at terminal *b* rises from a voltage approximating that of source 30 to a voltage approximating that of source 31.

For reasons similar to those discussed above, transistor $T_1'$ is not instantaneously rendered conducting when transistor $T_3'$ is turned off since capacitor 45 has charged in the interim to a positive potential approaching that of source 42. When transistor $T_3'$ is turned off, capacitor 45 maintains a positive voltage at the base electrode of transistor $T_1'$ during the period in which capacitor 45 discharges through diode 46, resistance 44 and resistance 43 to negative source 30. When capacitor 45 discharges to a sufficient level to permit conduction of transistor $T_1'$, an output pulse is delivered at terminal *b*, as described above. This situation is graphically depicted at lines 36 and 38 of FIG. 6 under the "Successive Pulses" heading.

*Overlapping "Add" and "Subtract" Pulses*

In this instance, it will be assumed that switch 41 closes followed by the closing of switch 40, the opening of switch 41 and the opening of switch 40, as shown at curves 55 and 54 of FIG. 6.

When switch 41 is closed to initiate the operation, transistor $T_4'$ is rendered nonconducting and after a brief interval occasioned by capacitor delay 47, transistor $T_2'$ is energized, as explained above, producing an output pulse at terminal *a* shown in FIG. 6, line 37 as pulse 52.

While transistor $T_2'$ remains energized and switch 41 is closed as an "add" indication from the perforator, an end-of-message pulse arrives from the reader as a "subtract" indication. Switch 40 is closed and transistor $T_3'$ is driven into the nonconducting condition in consequence of the ground potential on the base electrode thereof. At this time no output pulse appears at terminal *b* since transistors $T_1'$ and $T_2'$ are in flip-flop arrangement in which, with transistor $T_2'$ already conducting, transistor $T_1'$ is cut off.

At this time condenser $X_4$ is reoriented in polarity in consequence of the positive potential on terminal *a* from source 31 during the continuance of the output pulse at terminal *a*. Thus condenser $X_4$ switches in orientation from source 31, emitter-collector of transistor $T_2'$ and switch 40 to ground.

When switch 41 is opened at the termination of the "add" pulse at terminal *a*1, transistor $T_4'$ is energized in the low impedance condition and transistor $T_2'$ is rendered nonconducting, in the manner described above. Since at this time transistor $T_3'$ is nonconducting, transistor $T_1'$ is now rendered conducting in view of the negative potential on the base electrode thereof, after, however, the delay period introduced through the discharge of capacitor 45, referred to above.

Following the predetermined delay period, an output pulse appears at terminal *b* approaching the level of source 31, even though switch 40 has already been opened as shown at curves 54 and 53, lines 36 and 38 of FIG. 6. This output pulse is produced although switch 40 is open since condenser $X_4$ is now gradually switched back from source 29, resistor 48, resistor 49, condenser $X_4$ and resistor 43 to negative source 30.

The impedances of resistors 48, 49 and 43 and the potentials of sources 29 and 30 are arranged as described herein to provide substantially zero or ground potential at the base electrode of transistor $T_3'$ for the interval during which condenser $X_4$ is reoriented. Thus transistor $T_3'$ sees, in effect, a ground condition at the base electrode thereof and drives transistor $T_1'$ into the conducting condition to produce an output at terminal *b* shown at pulse 53, line 38 in FIG. 6. A similar analysis may be made where the "subtract" pulse appears first followed by an overlapping "add" pulse.

If the "subtract" pulse completely overshadows the "add" pulse by starting earlier and ending later, sequential "subtract" and "add" pulses in that order are nevertheless produced at terminals *b* and *a*. Thus, upon the closing of switch 40 transistor $T_3'$ will be driven into the nonconducting condition, and transistor $T_1'$ will be rendered conducting to produce an output pulse at terminal *b* after the time delay occasioned by capacitor 45. Subsequently, when switch 41 is closed, transistor $T_4'$ will be rendered nonconducting but transistor $T_2'$ will be prevented from turning on in consequence of the flip-flop feedback connections between transistors $T_1'$ and $T_2'$. Condenser $X_3$ will be reoriented over a circuit from potential source 31, emitter-collector of transistor $T_1'$, condenser $X_3$, switch 41 to ground.

When switch 41 is released, transistor $T_4'$ is rendered conducting but condenser $X_3$ does not shift in polarization in consequence of the continued positive output potential on terminal *b* which is applied to the upper electrode of condenser $X_3$.

When switch 40 is released, transistor $T_3'$ is rendered conducting and transistor $T_1'$ nonconducting to terminate the output pulse at terminal *b*. Condenser $X_3$ now switches back from source 29, resistors 71 and 70, condenser $X_3$, resistor 34 to negative source 30. Transistor $T_4'$ is rendered nonconducting as a result of the simulated ground condition produced thereat. After an appropriate delay introduced by capacitor 47, transistor $T_2'$ will be rendered conducting, as explained above. An output pulse thus appears at terminal *a*.

It will be noted that, although switch 40 is released and switch 41 is also released, the memory inherent in the reorientation of condenser $X_3$ nevertheless produces an output pulse at terminal *a* in consequence of transistor $T_4'$ experiencing what is, in effect, a ground potential at the base electrode thereof in consequence of the gradual reorientation of condenser $X_3$ over the path traced above.

Thus it is seen that if successive pulses are received, the timing circuit operates in the above-described manner to provide successive pulses on terminals *a* and *b* with no participation by condensers $X_3$ and $X_4$. However, when overlapping or overshadowing pulses occur, the first switch to be closed produces the first output pulse, and the second switch to be closed will produce a successive output pulse an appropriate time interval after the termination of the preceding output pulse in consequence of the reorientation of the appropriate crystal and independent of the order of release of switches 40 and 41.

*Simultaneous Arrival of "Add" and "Subtract" Pulses*

If both switches 40 and 41 are simultaneously closed to indicate simultaneous arrival of "add" and "subtract" pulses from the perforator and transmitter, respectively, transistors $T_3'$ and $T_4'$ will be rendered nonconducting substantially simultaneously but since transistors $T_1'$ and $T_2'$ are connected in a flip-flop circuit arrangement an astable condition obtains in which transistor $T_1'$ or $T_2'$, but not both, is energized. An output pulse is initiated at terminal *a* or terminal *b* in accordance with the selected transistor of the flip-flop $T_1'$ and $T_2'$. Subsequently, the operation of the circuit is similar to that described above for overlapping pulses, i.e., a pulse is produced at one terminal followed by a brief space and a pulse at the other terminal during the reorientation time of either condenser $X_3$ or $X_4$.

An illustration in which transistor $T_2'$ is selected in the astable condition is shown at pulses 56 and 57 of FIG. 6.

Line 39 of FIG. 6 graphically illustrates the inputs at terminal D of FIG. 4 comprising a summation of the pulses shown on lines 37 and 38.

In an illustrative arrangement the potential sources indicated in FIGS. 4 and 5 may take the following values:

| | Volts |
|---|---|
| 18 | −10.5 |
| 25 | +3.0 |
| 29 | +40.0 |
| 30 | −25.0 |
| 31 | +20.0 |
| 42 | +25.0 |
| 60 | −22.5 |
| 61 | −10.5 |
| 62 | −3.0 |
| 63 | +10.5 |
| 64 | +7.5 |
| 65 | +21.0 |
| 66 | +25.5 |

The above embodiments and values are merely exemplary and it is understood that various modifications may be made by those skilled in the art without departing from the spirit and scope of the invention.

What is claimed is:

1. A counting circuit including a first and second ferroelectric crystal condenser, pulsing means operative to generate first pulses to store unitary charges in said second condenser and to generate second pulses to remove unitary charges from said second condenser, means serially coupling said first condenser between said second condenser and said pulsing means, first and second asymmetrically conducting devices, switching means under the control of said first and said second pulses for connecting said devices in shunt with said second condenser, a utilization circuit connected in shunt with said second condenser, and means coupled to said second condenser and effective on the complete discharge of said second condenser and the reception of a said second pulse to deliver a pulse of current through said utilization circuit.

2. A ferroelectric counting circuit comprising first ferroelectric capacitor means, second ferroelectric capacitor means having a larger electrode area than said first capacitor means, a source of first and second pulses of the same polarity connected to said first ferroelectric capacitor means, means interconnecting said capacitor means, a first asymmetrically conducting device and a second asymmetrically conducting device, switching means for connecting said devices in shunt with said second ferroelectric capacitor means under the control of said first and said second pulses, a utilization device connected in shunt with said second capacitor means, said first and second capacitor means being effective in response to the receipt of a said first pulse and the connection of said first asymmetrically conducting device in shunt with said second capacitor means by said switching means to serially switch in orientation thereby applying a unitary charge to said second capacitor means, and means responsive to the termination of said first pulse for switching back the orientation of said first capacitor means over a path including said first asymmetrically conducting device, said first and second capacitor means being additionally effective in response to a said second pulse to serially switch in orientation to remove a unitary charge from said second capacitor means.

3. A ferroelectric counting circuit in accordance with claim 2 wherein said source of pulses includes first and second input terminals and first and second output terminals, first bistable means serially coupling said first input terminal to said first output terminal and operative responsive to the appearance of an input pulse at said first input terminal to produce a said first pulse at said first output terminal, second bistable means serially coupling said second input terminal to said second output terminal and operative responsive to the appearance of an input pulse at said second input terminal to produce a said second pulse at said second output terminal, and a ferroelectric capacitor connected between said first input terminal and said second output terminal, said ferroelectric capacitor being responsive to the appearance of an input pulse at said second input terminal and a successive overlapping input pulse at said first input terminal to switch orientation, said ferroelectric capacitor being additionally responsive to the termination of said input pulse at said second input terminal to switch back in orientation thereby to operate said first bistable means to produce a said first pulse at said first output terminal.

4. A ferroelectric counting circuit in accordance with claim 2 wherein said source of pulses includes first and second input terminals, first and second output terminals, first input bistable means connected to said first input terminals, first output bistable means serially coupling said first input bistable means to said first output terminal, second input bistable means connected to said second input terminal, second output bistable means serially coupling said second input bistable means to said second output terminal, a first ferroelectric capacitor serially connected between said first input terminal and said second output terminal and responsive to the appearance of an input pulse at said second input terminal followed by an overlapping input pulse at said first input terminal to switch in orientation and additionally responsive to the termination of both of said input pulses to switch back in orientation thereby to condition said first input and output bistable means to produce a said first pulse at said first output terminal, and means for interconnecting said first and said second output bistable means in flip-flop feedback relationship, said first and second output bistable means being responsive to the simultaneous appearance of input pulses at said first and second input terminals to condition only one of said output bistable means to produce a pulse on the associated output terminal, said ferroelectric capacitor connected to said associated output terminal being responsive to the pulse thereon to switch in orientation and additionally responsive to the termination of said input pulses to condition said other output bistable means to produce a pulse.

5. A ferroelectric counting circuit comprising first ferroelectric capacitor means, second ferroelectric capacitor means having a charge thereon and a larger electrode area than said first capacitor means, means for interconnecting said capacitor means, a source of first and second pulses of the same polarity, first and second asymmetrically conducting devices, switching means for connecting said devices in shunt with said second capacitor means under the control of said first and said second pulses, a utilization device connected in shunt with said second ferroelectric capacitor means, said first and second capacitor means being responsive to the receipt of a said second pulse and the connection of said second asymmetrically conducting device in shunt with said second capacitor means by said switching means to switch the state of said first capacitor means through said second asymmetrically conducting device, means responsive to the termination of said second pulse to restore said first capacitor means to its original state over a path including said second capacitor means thereby removing a discrete charge from said second capacitor means, and means responsive to the cessation of said first pulses to switch the state of said first capacitor means over a path including said second capacitor means to add a unitary charge to said second capacitor means.

6. A ferroelectric counting circuit in accordance with claim 5 wherein said source includes first and second input terminals and first and second output terminals, first bistable means serially coupling said first input terminal to said first output terminal and operative responsive to the appearance of an input pulse at said first input terminal to produce a said first pulse at said first output terminal, second bistable means serially coupling said second input terminal to said second output terminal and operative responsive to the appearance of an input pulse at said second input terminal to produce a said second pulse at said second output terminal, a ferroelectric capacitor connected between said first input terminal and said second output terminal, said ferroelectric capacitor being responsive to the appearance of an input pulse at said second input terminal and a successive overlapping input pulse at said first input terminal to switch orientation, said ferroelectric capacitor being additionally responsive to the termination of said input pulse at said second input terminal to switch back in orientation thereby to operate said first bistable means to produce a said first pulse at said first output terminal.

7. A ferroelectric counting circuit comprising a first ferroelectric capacitor, a second ferroelectric capacitor having a charge thereon and a larger electrode area than said first capacitor, means for interconnecting said capacitors, first and second pulsing sources, first and second asymmetrically conducting devices, switching means for connecting said devices in shunt with said second capacitor in response to pulses from said pulsing sources, a utilization device connected in shunt with said second ferroelectric capacitor, said first and second capacitors being responsive to the reception of a pulse from said second pulsing source and the shunting of said second capacitor by said second asymmetrically conducting device to switch the state of said first capacitor over a path including said second asymmetrically conducting device, means responsive to the cessation of said pulse to restore said first capacitor to its original state over a path including said second capacitor thereby removing a unitary charge from said second capacitor, means responsive to the cessation of pulses from said first pulsing source to switch the state of said first capacitor over a path including said second capacitor to add a unitary charge to said second capacitor, and means responsive to the complete discharge of said second capacitor and the reception of a subsequent pulse from said second pulsing source to deliver a pulse of current through said utilization device.

8. A ferroelectric counting circuit in accordance with claim 7 wherein said first and second pulsing sources together include first and second input terminals and first and second output terminals, first bistable means serially coupling said first input terminal to said first output terminal and operative responsive to the appearance of an input pulse at said first input terminal to produce an output pulse on said first output terminal, second bistable means serially coupling said second input terminal to said second output terminal and operative responsive to the appearance of an input pulse at said second input terminal to produce an output pulse at said second output terminal, and a ferroelectric capacitor connected between said first input terminal and said second output terminal, said ferroelectric capacitor being responsive to the appearance of an input pulse at said second input terminal and a successive overlapping input pulse at said first input terminal to switch orientation, said ferroelectric capacitor being additionally responsive to the termination of said input pulse at said second input terminal to switch back in orientation thereby to operate said first bistable means to produce an ouptut pulse at said first output terminal.

9. A ferroelectric counting circuit including first ferroelectric capacitor means, second ferroelectric capacitor means having a larger electrode area than said first capacitor means, means for interconnecting said capacitor means, first and second pulsing means connected to said first capacitor means, a first and second asymmetrically conducting device connectable in shunt with said second capacitor means, a utilization circuit connected in shunt with said second capacitor means, said first and second capacitor means being responsive to an input pulse of one polarity from said first pulsing means and the connection of said first asymmetrically conducting device in shunt with said second capacitor means to serially switch in orientation thereby applying a unitary charge to said second capacitor means, means responsive to the termination of said pulse from said first pulsing means for switching back said first capacitor means in series with said first asymmetrically conducting device, said capacitor means being additionally responsive to a pulse from said second pulsing means of said one polarity and the connection of said second asymmetrically conducting device in shunt with said second capacitor means to switch said first capacitor means in series with said second asymmetrically conducting device, and means responsive to the termination of said pulse from said second pulsing means for switching back said first capacitor means in series with said second capacitor means thereby to remove a unitary charge from said second capacitor means.

10. A ferroelectric counting circuit including first ferroelectric capacitor means, second ferroelectric capacitor means having a larger electrode area than said first capacitor means, means for interconnecting said capacitor means, first and second pulsing means connected to said first capacitor means, first and second asymmetrically conducting devices connectable in shunt with said second capacitor means, said devices being oppositely poled, a utilization circuit connected in shunt with said second capacitor means, said first and second capacitor means being responsive to an input pulse from said first pulsing means and the connection of said first asymmetrically conducting device in shunt with said second capacitor means to serially switch in orientation thereby to apply a unitary charge to said second capacitor means, means responsive to the termination of said pulse from said first pulsing means for switching back said first capacitor means in series with said first asymmetrically conducting device, said first and second capacitor means being additionally responsive to a pulse from said second pulsing means and the connection of said second asymmetrically conducting device in shunt with said second capacitor means to switch said first capacitor means in series with said second asymmetrically conducting device, means responsive to the termination of said pulse from said second pulsing means for switching back said first capacitor means in series with said second capacitor means thereby to remove a unitary charge from said second capacitor means, and a diode connected serially between said second ferroelectric capacitor means and said utilization circuit, said diode having a low resistance forward conduction characteristic, a high resistance reverse conduction characteristic for voltages lower than a critical value and a substantially constant voltage region in the reverse conduction characteristic for voltages exceeding said critical value.

11. A ferroelectric counting circuit including first ferroelectric capacitor means, second ferroelectric capacitor means having a larger electrode area than said first capacitor means, means for interconnecting said capacitor means, first pulsing means connectable to said first capacitor means, second pulsing means connected to said first capacitor means, a first asymmetrically conducting device and a second asymmetrically conducting device connectable in shunt with said second capacitor means, said devices being oppositely polarized, a utilization circuit connected in shunt with said second capacitor means, means responsive to an initial pulse from said first pulsing means for absorbing said pulse before transmission to said first capacitor means and for connecting said first pulsing means to said first capacitor means, means responsive to subsequent pulses from said first pulsing means for connecting said first asymmetrically conducting device in shunt with said second capacitor means, said capacitor means being effective to serially switch in orientation in response to said subsequent pulses thereby to store unitary charges in said second capacitor means, means effective on the termination of said subsequent pulses from said first pulsing means for switching back said first capacitor means in series with said first asymmetrically conducting device, means responsive to pulses from said second pulsing means for connecting said second asymmetrically conducting device in shunt with said second capacitor means, said first capacitor means being adapted to switch state in series with said second asymmetrically conducting device in response to said pulses from said second pulsing means, and means responsive to the termination of said pulses from said second pulsing means for switching back the state of said first capacitor means in series with said second capacitor means thereby to remove unitary charges from said second capacitor means.

12. A ferroelectric counting circuit including first and second ferroelectric capacitor means, said second capacitor means having a larger electrode area than said first capacitor means, means for interconnecting said capacitor means, a first pulsing means connectable to said first capacitor means, a second pulsing means connected to said first capacitor means, a first asymmetrically conducting device and a second asymmetrically conducting device connectable in shunt with said second capacitor means, said devices being oppositely poled, a utilization circuit connected in shunt with said second capacitor means, means responsive to an initial pulse from said first pulsing means for absorbing said pulse and connecting said first pulsing means to said first capacitor means, means responsive to subsequent pulses from said first pulsing means for connecting said first asymmetrically conducting device in shunt with said second capacitor means, said capacitor means being adapted to serially switch state responsive to said subsequent pulses thereby to store unitary charges in said second capacitor means, means responsive to the termination of said subsequent pulses for switching back said first capacitor means in series with said first asymmetrically conducting device, means responsive to pulses from said second pulsing means for connecting said second asymmetrically conducting device in shunt with said second capacitor means, said first capacitor means being effective responsive to pulses from said second pulsing means to switch state in series with said second asymmetrically conducting device, means responsive to the termination of said pulses from said second pulsing means for switching back the state of said first capacitor means in series with said second capacitor means thereby to remove unitary charges from said second capacitor means, and means responsive to the complete discharge of said second capacitor means and the arrival of a pulse from said second pulsing means to deliver a pulse of current through said utilization circuit.

13. A ferroelectric counting circuit including a first and second ferroelectric condenser, a first pulsing means operative to store unitary charges in said second condenser, a second pulsing means operative to remove unitary charges from said second condenser, means serially coupling said first condenser between said second condenser and at least one of said pulsing means, first and second asymmetrically conducting devices, switching means responsive to pulses from said first and said second pulsing means for connecting said devices in shunt with said second condenser, and a utilization circuit connected in shunt with said second condenser, said second pulsing means being effective on the complete discharge of said second condenser to deliver a pulse of current through said utilization circuit, said first and second pulsing means including first and second input terminals and first and second output terminals, first bistable means coupling said first input and output terminals, and second bistable means coupling said second input and output terminals, said first bistable means being responsive to an input pulse at said first input terminal to produce a corresponding output pulse at said first output terminal, said second bistable means being operative responsive to an input pulse at said second input terminal successive in time to said input pulse at said first input terminal to produce a corresponding output pulse at said second output terminal.

14. A pulse counting circuit comprising an input circuit for receiving add pulses and subtract pulses, a first ferroelectric capacitor, a second ferroelectric capacitor initially polarized and connected in series between said first capacitor and said input circuit, first switching means controlled by each add pulse for causing said second capacitor to switch through a full cycle of polarization change and for causing said first capacitor to accumulate a unit charge, and second switching means controlled by each subtract pulse for causing said second capacitor to switch through a full cycle of polarization change and for causing said first capacitor to relinquish an accumulated unit charge.

15. The counting circuit defined in claim 14 wherein said first switching means comprises a shunting circuit, wherein said first switching means is controlled by each add pulse to cause said second capacitor to reverse in polarization in series with said first capacitor whereby said first capacitor accumulates a unit charge, and wherein said first switching means is also controlled by each add pulse to cause said second capacitor to restore in polarization in series with said shunting circuit.

16. The counting circuit defined in claim 14 wherein said second switching means comprises a shunting circuit, wherein said second switching means is controlled by each subtract pulse to cause said second capacitor to reverse in polarization in series with said shunting circuit, and wherein said second switching means is also controlled by each subtract pulse to cause said second capacitor to restore in polarization in series with said first capacitor whereby said first capacitor relinquishes a unit charge.

17. The counting circuit defined in claim 14 wherein said first capacitor has a multi-unit charge capacity, wherein said second capacitor has a single unit charge capacity, and wherein said first and second switching means are connected to said input means and are respectively controlled by said add and subtract pulses received at said input means.

18. The counting circuit defined in claim 17 wherein a node is defined by the connection between said first and second capacitors, wherein is provided a utilization circuit, and wherein is provided discharge means connected in series between said node and said utilization circuit and operative to deliver a control pulse to said utilization circuit in response to the receipt of a subtract pulse at said input means at a time when said first capacitor is in a charge state representing the relinquishment of all accumulated unit charges.

19. A pulse counting circuit comprising an input circuit for receiving add pulses and subtract pulses, a first ferroelectric capacitor, a second ferroelectric capacitor initially polarized and connected in series between said first capacitor and said input circuit, first switching means comprising a first shunting circuit, said first switching means being controlled by each add pulse to cause said second capacitor to reverse in polarization in series with said first capacitor whereby said first capacitor accumulates a unit charge and to cause said second capacitor to restore in polarization in series with said first shunting means, and second switching means comprising a second shunting circuit, said second switching means being controlled by each subtract pulse to cause said second capacitor to reverse in polarization in series with said second shunting circuit and to cause said second capacitor to restore in polarization in series with said first capacitor whereby said first capacitor relinquishes a unit charge.

20. The counting circuit defined in claim 19 wherein said input circuit comprises a first terminal for receiving said add pulses and a second terminal for receiving said subtract pulses, wherein said first switching means is controlled by the receipt of each add pulse at said first terminal, and wherein said second switching means is controlled by the receipt of each subtract pulse at said second terminal.

21. The counting circuit defined in claim 20 wherein said add and subtract pulses are of the same polarity, wherein said second capacitor reverses in polarization in response to the leading edge of each add and subtract pulse, and wherein said second capacitor restores in polarization in response to the trailing edge of each add and subtract pulse.

22. The counting circuit defined in claim 19 wherein said first and second shunting circuits comprise first and second asymmetrically conducting devices respectively, wherein said first and second devices are oppositely poled, wherein said first capacitor is connected in series between said second capacitor and a reference potential, and wherein said first and second devices are selectively connectable between said reference potential and said second capacitor in shunt of said first capacitor.

23. The counting circuit defined in claim 19 wherein said first and second shunting circuits comprise first and second bistable switching means respectively, and wherein said first and second bistable means are alternately operative under the control of said add and subtract pulses respectively.

24. The counting circuit defined in claim 22 wherein said first and second shunting circuits also comprise first and second bistable switching means respectively, wherein said first and second bistable means are alternately operative under the control of said add and subtract pulses respectively, wherein said first bistable means is operative to connect said first device between said reference potential and said second capacitor in shunt of said first capacitor, and wherein said second bistable means is operative to connect said second device between said reference potential and said second capacitor in shunt of said first capacitor.

25. The counting circuit defined in claim 24 wherein said input circuit comprises a first terminal for receiving said add pulses and a second terminal for receiving said subtract pulses, wherein said input circuit also comprises coupling means, wherein said coupling means comprises first and second branches for coupling said first and second terminals to said second capacitor, wherein said first bistable means is rendered inoperative upon the appearance of each substract pulse on said second branch, and wherein is provided means responsive to the appearance of each add pulse on said first branch to render operative said first bistable means and responsive to said first bistable means being rendered inoperative to render operative said second bistable means.

26. The counting circuit defined in claim 25 wherein said responsive means is a bistable element, wherein said bistable element and said first bistable means are connected in flip-flop arrangement, and wherein said asymmetrically conducting devices are diodes.

27. A pulse counting circuit comprising an input circuit having a first terminal for receiving add pulses and a second terminal for receiving subtract pulses, coupling means in said input circuit connected to said first and second terminals, a first ferroelectric capacitor having a multi-unit charge capacity, a second ferroelectric capacitor initially polarized and having a single unit charge capacity and connected in series between said first capacitor and said coupling means, first switching means controllable by each add pulse for causing said second capacitor to switch through a full cycle of polarization change and for causing said first capacitor to accumulate a unit charge, second switching means controlled by each subtract pulse for causing said second capacitor to switch through a full cycle of polarization change and for causing said first capacitor to relinquish an accumulated unit charge, and discharge means connected to said first capacitor and operative to deliver a control pulse in response to the receipt of a subtract pulse at a time when said first capacitor is in a charge state representing the relinquishment of all of its accumulated charges.

28. The counting circuit defined in claim 27 wherein said coupling means comprises first and second branches associated with said first and second terminals respectively, wherein each of said branches comprises an asymmetrically conducting device intermediate said second capacitor and said associated terminal, and wherein said first branch comprises pulse absorbing means effective to absorb the first add pulse received at said first terminal whenever said first capacitor is in a charge state representing the relinquishment of all of its accumulated charges.

29. The counting circuit defined in claim 28 wherein said pulse absorbing means comprises a bistable device intermediate said first terminal and said associated asymmetrically conducting device, and wherein said pulse absorbing means comprises enabling means responsive to the appearance of a said first add pulse on said first branch to enable said bistable device at the trailing end of said first add pulse and responsive to said control pulse for disabling said bistable means.

30. The counting circuit defined in claim 29 wherein said asymmetrically conducting devices are diodes, wherein said enabling means is electronic, and wherein said bistable means is a transistor.

References Cited in the file of this patent

UNITED STATES PATENTS

| | | |
|---|---|---|
| 2,557,729 | Eckert | June 19, 1951 |
| 2,636,133 | Hussey | Apr. 21, 1953 |
| 2,666,195 | Bachelet et al. | Jan. 12, 1954 |
| 2,695,396 | Anderson | Nov. 23, 1954 |
| 2,854,590 | Wolfe | Sept. 30, 1958 |
| 2,864,079 | Anderson | Dec. 9, 1958 |
| 2,872,661 | Young et al. | Feb. 3, 1959 |
| 2,876,435 | Anderson | Mar. 3, 1959 |